Figure 1:
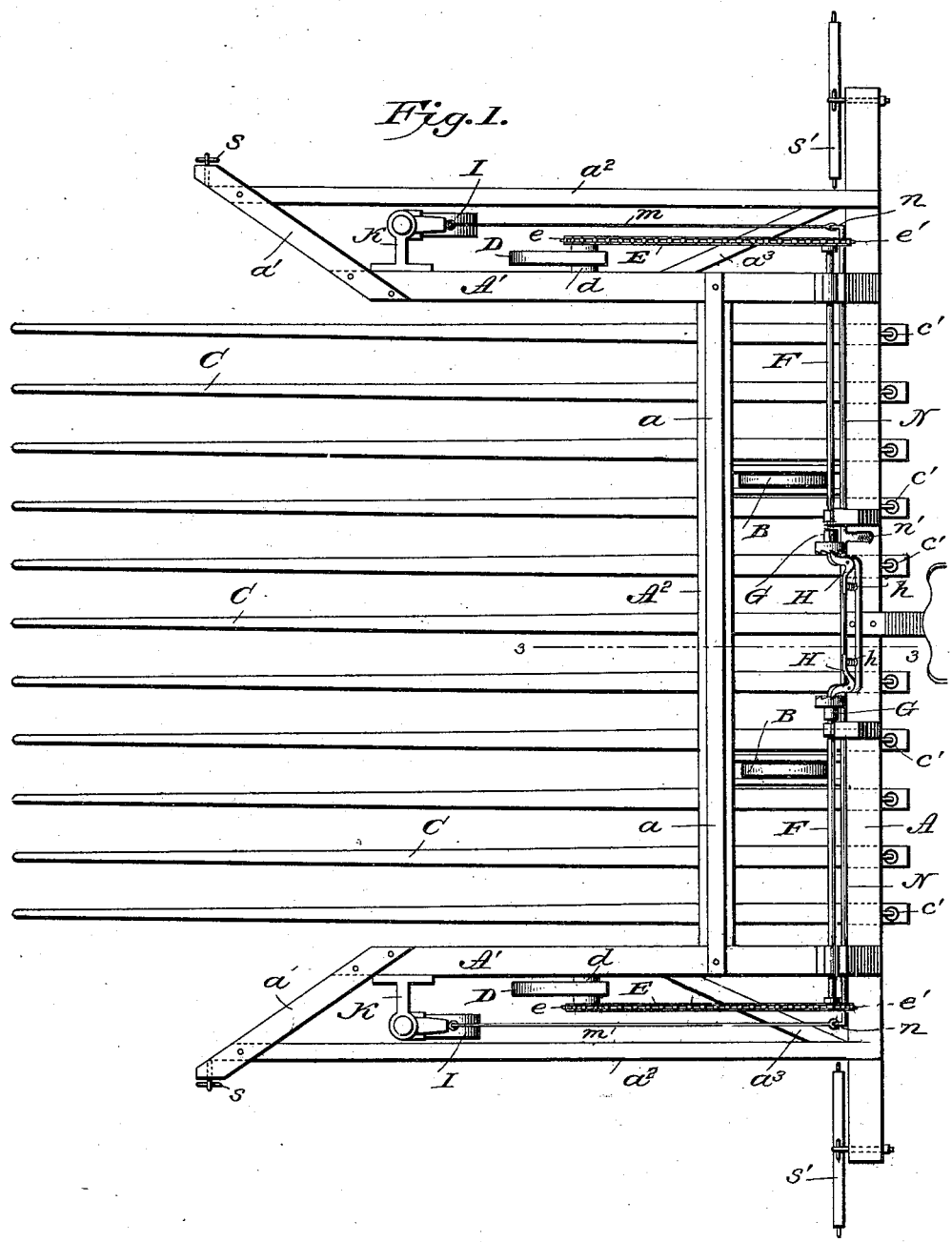

(No Model.) 2 Sheets—Sheet 1.

W. J. COOK.
HORSE HAY RAKE.

No. 581,001. Patented Apr. 20, 1897.

WITNESSES
G. S. Elliott
T. W. Johnson

William J. Cook
INVENTOR
by
Attorney (No Model.) 2 Sheets—Sheet 2.
W. J. COOK.
HORSE HAY RAKE.
No. 581,001. Patented Apr. 20, 1897.
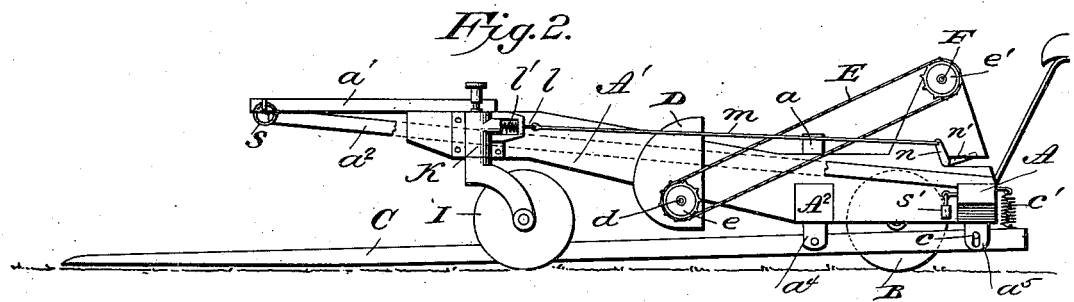
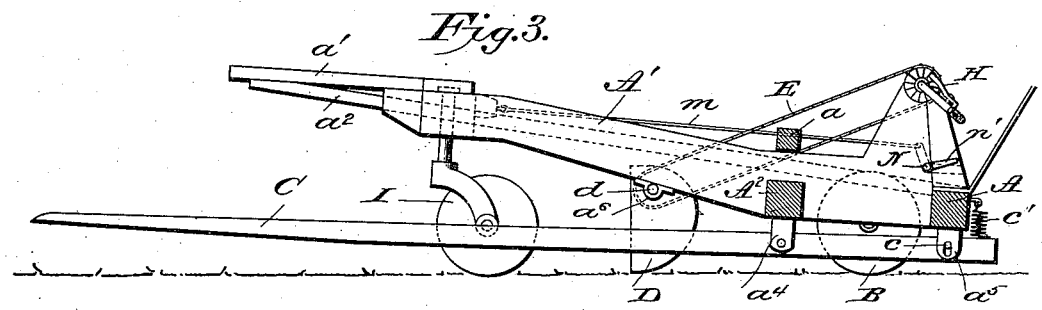
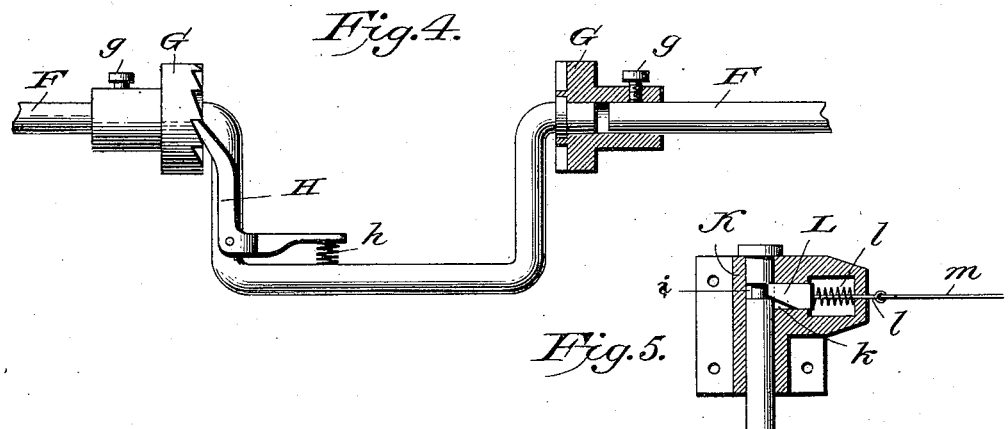
WITNESSES
William J. Cook
INVENTOR
by
Attorney

UNITED STATES PATENT OFFICE.

WILLIAM J. COOK, OF AUGUSTA, MONTANA.

HORSE HAY-RAKE.

SPECIFICATION forming part of Letters Patent No. 581,001, dated April 20, 1897.

Application filed May 14, 1896. Serial No. 591,539. (No model.)

*To all whom it may concern:*

Be it known that I, WILLIAM J. COOK, a citizen of the United States of America, residing at Augusta, in the county of Lewis and Clarke and State of Montana, have invented certain new and useful Improvements in Horse Hay-Rakes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in horse hay-rakes of that class known as "drags," the object of the same being to provide a hay-rake in which certain mechanisms are employed for elevating the forward end of the teeth of the machine clear of the ground when a sufficient quantity of hay has been gathered, so that in carrying the load to the stack the said teeth will be out of operative position, thereby enabling the machine to travel over rough ground, this arrangement also providing a lighter draft in transporting the load.

With the above ends in view the invention consists in providing a hay-rake with cam-wheels journaled to the frame and means for moving said cam-wheels in unison or independently, so that they may contact with the ground and elevate the forward part of the teeth a suitable distance above the ground.

The invention further consists in providing casters which will automatically fall into a position to support the forward end of the machine in an elevated position when raised by the cam-wheels, in connection with particular means for releasing the cam-wheels.

The invention further consists in providing a hay-rake with cam-wheels, mechanism for throwing said cam-wheels in contact with the ground, and casters which will automatically fall into a position to support the forward end of the machine in an elevated position when raised by the cam-wheels.

The invention further consists in the particular construction and arrangement of the different parts of the machine for the purposes mentioned, all as will be hereinafter set forth and claimed.

In the accompanying drawings, forming part of this specification, Figure 1 is a plan view of a horse hay-rake constructed in accordance with my invention. Fig. 2 is a side elevation of the machine, showing the parts arranged with the teeth in position for gathering hay. Fig. 3 is a longitudinal sectional view with the rake-teeth elevated or in position for transporting the load. Fig. 4 is a detail view of the crank-shaft, forming a part of the mechanism for operating the cam-wheels; and Fig. 5 is a detail sectional view of the bearing for the casters, including the spring-actuated bolt which engages said casters.

The main frame of the machine consists of a transverse beam A, to which are rigidly secured forwardly-projecting beams A' A', forming the side pieces of the frame, said side pieces being further connected to each other by a transverse beam $A^2$ and by a bar $a$, extending across the frame above the beam $A^2$. To the forward ends of the side pieces A' are secured bars $a'$, which extend outward at an angle with said side pieces and carry rings $s$ at their ends, and the beam A has singletrees $s'$ connected thereto, to which the horses or draft-animals are hitched, the holdback-chains of the harness being connected to the rings $s$. On each side of the main frame is a longitudinal bar $a^2$, secured at its ends to the beam A and bar $a'$, said longitudinal bars extending parallel with the side pieces A' and leaving a space at each side of the machine to receive certain parts hereinafter described, and serve to protect said parts from being injured by the horses or draft-animals. The main frame is further braced by diagonal strips $a^3$, extending between the longitudinal beams A' and $a^2$, as shown, and the rear part of said frame is supported by wheels B B, located between the beams A and $A^2$.

To the transverse beam $A^2$ of the frame of the machine are attached depending plates or hangers $a^4$, between which the rake-teeth C are pivoted at a suitable distance from their rear ends, and said teeth are provided with laterally-projecting pins $c$, which engage with vertical slots in depending plates $a^5$, secured to the under side of the transverse beam A. The rear ends of the teeth are connected to helical springs $c'$, carried by the beam A, the tendency of said springs being to hold the forward ends of the rake-teeth normally depressed with the pins $c$ in contact with the upper ends of the slots in the plates $a^5$, this arrangement providing an independent movement of the teeth upon their pivots, so that they can ride over obstructions or uneven ground.

D designates the cam-wheels, which are mounted on stub-shafts $d$, bearing in bearings $a^6$, secured to the under side of the side pieces A' of the main frame, said cam-wheels being of the configuration shown in the drawings, and the shafts $d$ pass through the same nearer one end, so that when said cam-wheels are brought or moved into contact with the ground from the position shown in Fig. 2 the eccentric periphery thereof will raise the main frame, as shown in Fig. 3. The shafts $d$ each have a sprocket-wheel $e$ mounted thereon, and over said sprocket-wheels pass chains E, which extend to and around sprocket-wheels $e'$, mounted on the ends of a crank-shaft F, which extends transversely across the frame of the machine and is journaled in uprights forming a part of the side pieces A', said crank-shaft being located within easy reach of the driver's seat, so that it can be turned to move the cam-wheels in contact with the ground through the intervention of the sprocket-wheels and chains hereinbefore mentioned.

The crank-shaft F is preferably made up of three sections, the straight sections to which the sprocket-wheels are attached having collars G secured to their inner ends by set-screws $g$, and between said sections is located the crank portion of the shaft, the ends of said crank portion bearing loosely in the collars G. The opposing faces of the collars G are provided with ratchet-teeth, with which engage independent pawls H, carried by the crank portion of the shaft and thrown into engagement with the ratchet-teeth by interposed helical springs $h$. It will be noted that by this arrangement the cam-wheels can be moved in unison or independently, as either one of the sections of the crank-shaft F can be thrown out of engagement with the crank portion thereof by manipulating one of the pawls H, this being desirable when it is required to elevate one side of the machine to clear an obstruction.

I designates caster-wheels which are located on each side of the main frame of the machine, the stocks of said caster-wheels rotating in castings K, secured to the side pieces A'. The castings or frames K are each provided with a vertical opening, which receives the stock of the caster-wheel, and with a horizontal opening $k$, in which is located a sliding bolt L, the opening $k$ communicating with the vertical opening, so that the sliding bolt can engage an annular recess $i$ in the stock of the caster-wheel, for the purpose hereinafter mentioned. The sliding bolt L is provided with a stem $l$, that extends beyond the casting or frame K, and to the outer end of this stem is attached a cord or flexible connection $m$, by which the bolt is retracted against the action of a helical spring $l'$, that encircles the stem and is interposed between the main part of the bolt and a wall of the casting or frame K, the tendency of the spring being to throw the bolt into engagement with the stock of the caster-wheel. The cords or flexible connections $m$ may extend directly to the driver's seat, but I prefer to connect the same to projecting arms $n$ of a transverse shaft N, journaled in the side pieces A' and provided with a pedal $n'$, located in front of the driver's seat, so that by depressing said pedal the shaft will be rocked and will draw upon the cords or flexible connections to retract the bolts in unison. When the bolts are retracted or not in engagement with the annular recesses $i$, the forward part of the machine will be supported by the lower edge of the castings or frames K, bearing upon the shoulders of the stocks of the caster-wheels, as shown in Fig. 2, and when the forward part of the machine is elevated said caster-wheels will remain stationary with respect to the machine and the castings or frames K will move upward on the stocks until the sliding bolts L engage the annular recesses $i$, in which position the machine will be supported, as shown in Fig. 3.

From the foregoing description, in connection with the accompanying drawings, the operation of the machine will be readily understood, the several parts being operated from the driver's seat, for when the bolts L are retracted or the caster-wheels in engagement with the machine, as shown in Fig. 2, and the cam-wheels turned so that the major portion thereof will be above the shaft $d$ to elevate the forward part of the machine when a load of hay has been gathered it is only necessary for the driver to turn the crank-shaft F, which will move the cam-wheels in contact with the ground through the intervention of the sprocket-wheels $e\ e'$ and chains E, and as the machine is drawn forward said cam-wheels will act to raise the forward part thereof to cause the bolts L to engage the annular recesses $i$ of the caster-wheels, in which position the forward ends of the teeth C will be a suitable distance above the ground to clear obstructions in transporting the load to the stack.

Having thus described my invention, I do not wish to be limited to the particular construction and arrangement of the parts as herein shown and described, but desire to reserve the right to modify or change such construction within the spirit and scope of my claims.

I claim—

1. In a horse hay-rake, the combination with a frame carrying rake-teeth, of cam-wheels journaled to the frame, and means for moving said cam-wheels in unison or independently so that they may contact with the ground, for the purpose set forth.

2. In a horse hay-rake, the combination with a frame carrying rake-teeth, of cam-wheels journaled to the frame, suitably-supported transverse shafts, means connecting each cam-wheel to its shaft, and supplemental means connecting the shafts the actuation of which will move said cam-wheels into contact with the ground; said supplemental means embodying devices whereby the cam-wheels can be adjusted either in unison or independently, for the purpose set forth.

3. In a horse hay-rake, the combination with a frame carrying rake-teeth, of cam-wheels journaled in the frame and provided with sprocket-wheels, and a transverse shaft having sprocket-wheels which are connected by chains to the sprocket-wheels of the cam-wheels the transverse shaft being in two parts, each part being supported to be turned independently of the other part, substantially as shown and for the purpose set forth.

4. In a horse hay-rake, the combination with a frame carrying rake-teeth, of cam-wheels journaled in the frame, and a transverse shaft having independent sections which are connected to said cam-wheels, substantially as shown and described.

5. In a horse hay-rake, the combination with a frame carrying rake-teeth, of cam-wheels journaled in the frame and provided with sprocket-wheels, a transverse shaft composed of sections carrying sprocket-wheels connected by chains to the sprocket-wheels of the cam-wheels, ratchet-wheels mounted on the inner ends of said sections, and a crank portion having independent pawls in engagement with the ratchet-wheels, substantially as shown and for the purpose set forth.

6. In a horse hay-rake, the combination with a frame carrying rake-teeth, of caster-wheels vertically movable in castings attached to the main frame, the stocks of the caster-wheels having recesses; together with spring-actuated bolts carried by the castings and adapted to engage said recesses, rods for retracting said bolts attached thereto and to the bent ends of a shaft which is journaled upon the rear portion of the frame and is provided with a pedal the depression of which will retract the bolts, substantially as shown and for the purpose set forth.

7. In a horse hay-rake, the combination with a frame carrying rake-teeth, cam-wheels and means for throwing said cam-wheels into contact with the ground, of caster-wheels vertically movable in the main frame, and means carried by the main frame and adapted to engage the caster-wheels to support said frame at different elevations, substantially as shown and described.

In testimony whereof I affix my signature in presence of two witnesses.

WILLIAM J. COOK.

Witnesses:
FRED CRAECTMAN,
RICHARD AUCHARD.